(12) United States Patent
Ganor et al.

(10) Patent No.: US 11,811,026 B2
(45) Date of Patent: Nov. 7, 2023

(54) SUPPLYING POWER TO A TRANSMITTER USING A COIN CELL BATTERY

(71) Applicant: DSP Group Ltd., Herzliya (IL)

(72) Inventors: Assaf Ganor, Herzelia (IL); Tzahi Shalit, Herzelia (IL); Levi Schultz, Herzelia (IL)

(73) Assignee: DSP Group Ltd., Herzliya (IL)

( * ) Notice: Subject to any disclaimer, the term of this patent is extended or adjusted under 35 U.S.C. 154(b) by 681 days.

(21) Appl. No.: 16/808,422

(22) Filed: Mar. 4, 2020

(65) Prior Publication Data
US 2020/0313246 A1 Oct. 1, 2020

Related U.S. Application Data

(60) Provisional application No. 62/823,667, filed on Mar. 26, 2019.

(51) Int. Cl.
*H01M 10/42* (2006.01)
*H01M 10/04* (2006.01)
*H02J 7/34* (2006.01)

(52) U.S. Cl.
CPC ... *H01M 10/4264* (2013.01); *H01M 10/0436* (2013.01); *H02J 7/345* (2013.01)

(58) Field of Classification Search
CPC . H01M 10/4264; H01M 10/0436; H02J 7/345
See application file for complete search history.

(56) References Cited

U.S. PATENT DOCUMENTS

| | | | |
|---|---|---|---|
| 2014/0084700 A1* | 3/2014 | Anderson | H03F 1/565 307/104 |
| 2015/0194942 A1* | 7/2015 | Anderson | B82Y 40/00 330/297 |
| 2017/0077877 A1* | 3/2017 | Anderson | H03F 1/0261 |
| 2018/0180752 A1* | 6/2018 | Gabai | G01V 1/001 |
| 2019/0044362 A1* | 2/2019 | Beyer | H02J 7/0071 |

FOREIGN PATENT DOCUMENTS

CN 107394856 * 11/2017

* cited by examiner

*Primary Examiner* — Alexander Usyatinsky
(74) *Attorney, Agent, or Firm* — Leydig, Voit & Mayer Ltd.

(57) ABSTRACT

A coin cell powered device includes a regulator, a transmitter and a charge pump. The transmitter is configured to transmit signals during a transmission period while receiving power from the regulator, the power originated from an external capacitor. The charge pump is configured to perform, during a charging period, a charging process for charging the external capacitor to a charged voltage that exceeds a voltage of a cell coin, wherein the charging process may include iterations of (a) charging a charge pump capacitor by the coin cell, and (b) discharging the charge pump capacitor thereby charging the external capacitor. The capacitance of the charge pump capacitor is a fraction of a capacitance of the external capacitor. The duration of the charging period exceeds a duration of the transmission period.

15 Claims, 7 Drawing Sheets

SUPPLYING POWER TO A TRANSMITTER USING A COIN CELL BATTERY

CROSS REFERENCE

This application claims priority from U.S. provisional patent 62/823,667 filing date Mar. 26, 2019.

BACKGROUND OF THE INVENTION

A popular battery for internet of things (IOT) devices is the coin cell battery.

Some IOT devices include a transmitter that is idle most of the time and sparsely transmits signals (such as keep alive signals or other status signals). The duration of a transmission of the signal is much shorter than the duration between transmissions of consecutive signals. For example—the signal may be of a duration that is a fraction of a second and it is transmitted once an hour, once a day, and the like.

The transmission may require a relatively large amount of current (current peak) and the coin cell battery (hereinafter—coin cell) itself cannot supply the relatively large amount of current.

In order to provide the required current to the transmitter, the IOT device may include very big capacitors to handle the transmission pea. For example a transmission peak related to a BLUETOOTH™/Digital Enhanced Cordless Telecommunications (DECT) Link. Using the very big capacitors dramatically increases the cost and footprint of the IOT device.

The very big capacitors are required because the required capacitance is inversely proportional to the voltage difference between (a) the required voltage level for the transmitter, and (b) the voltage outputted by the coin cell.

The difference (dV) between (a) and (b) is very small (fractions of a volt) and thus there is a need to use the very big capacitors—having a capacitance of C, whereas C=ITX*tTX/dV. ITX is the current required by the transmitter and tTX is the duration of the transmission of a signal.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The current application may refer to a coin cell. A coin cell is merely a non-limiting example of a battery that is not capable of directly supplying the current peaks required by a transmitter. Other example of such batteries are compact batteries (width or depth may not exceed a few millimeters), batteries of limited output current (smaller than the current peak required by a transmitter).

The suggested system and method may also be adapted to prolong the lifespan of old NiMH battery that have a large series resistance that will cause similar voltage drops when near depletion. The suggested method and system may prolong the battery life.

Figure 1:
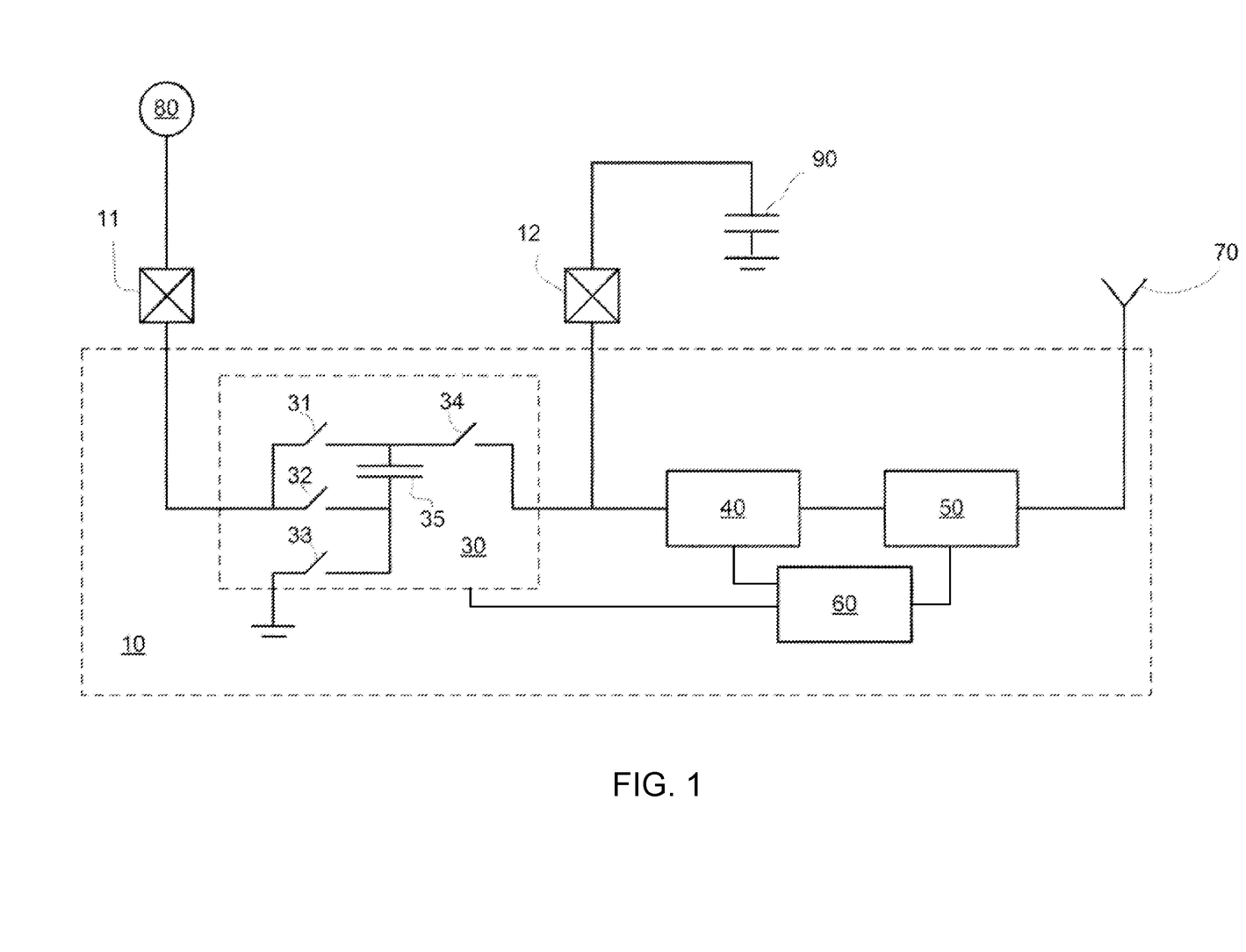
FIG. 1 illustrates an example of a device.

FIG. 1 illustrated a device 9 that may include:
a. External capacitor 90.
b. Coin cell 80.
c. Regulator 40.
d. Transmitter 50.
e. Controller 60.
f. Antenna 70 electrically coupled to the output of the transmitter 50.
g. One or more interfaces such as first interface 11 (for example a conductor and/or pin) that is electrically coupled to the coin cell 80, and second interface 12 that is electrically coupled to the external capacitor 90.
h. Charge pump 30 that may increase the voltage of the signal drained from the coin cell 80, and may slowly charge (via a switch and during a charging period) the capacitor to a higher voltage that the voltage of the coin cell.
i. Regulator 40 for discharging (via the switch and during a discharging period) the external capacitor 90, the regulator may lower the charged voltage of the external capacitor to a voltage required by the transmitter 50 (for example about the voltage that was originally supplied by the coin cell) and supplies the lowered voltage to the transmitter during the transmission of the signal.

The charge pump 30, the regulator 40, the transmitter 50, and a controller 60 (for controlling at least the charge pump 30, the regulator and the transmitter 50) may belong to unit 10 of the device, the unit may be a chip, may include a chip (integrated circuit) and/or may be connected to a printed circuit board.

The charge pump 30 includes a charge pump capacitor 35 that has a lower (even much lower) capacitance than the capacitance of the external capacitor 90. Accordingly—the charging of the external capacitor 90 is executed in multiple iterations whereas during each iteration the charge pump capacitor is charged (phase one) and then is discharged (phase two)—whereas the discharging of the charge pump capacitor charges the external capacitor.

FIGS. 1-4 illustrates the charge pump 30 as including a first switch 31, a second switch, a third switch 33, a fourth switch 34 and the charge pump capacitor 35.

The first switch 31 is connected between the first interface 11 and a first end of the charge pump capacitor 35.

The second switch 32 is connected between the first interface 11 and a second end of the charge pump capacitor 35.

The third switch 33 is connected between the ground and a second end of the charge pump capacitor 35.

The fourth switch 34 is connected between the second interface 12 and a first end of the charge pump capacitor 35.

The first switch 31 and the third switch 33 are first phase switches—they are closed during a first phase in which the charge pump capacitor is charged—and are open (disconnected) during the second phase and during the transmission period.

The second switch 32 and the fourth switch 34 are second phase switches—they are open (disconnected) during a first phase in which the charge pump capacitor is charged and during the transmission period—and are closed (connected) during the second phase—in which the charge pump charges the external capacitor 90.

Figure 2:
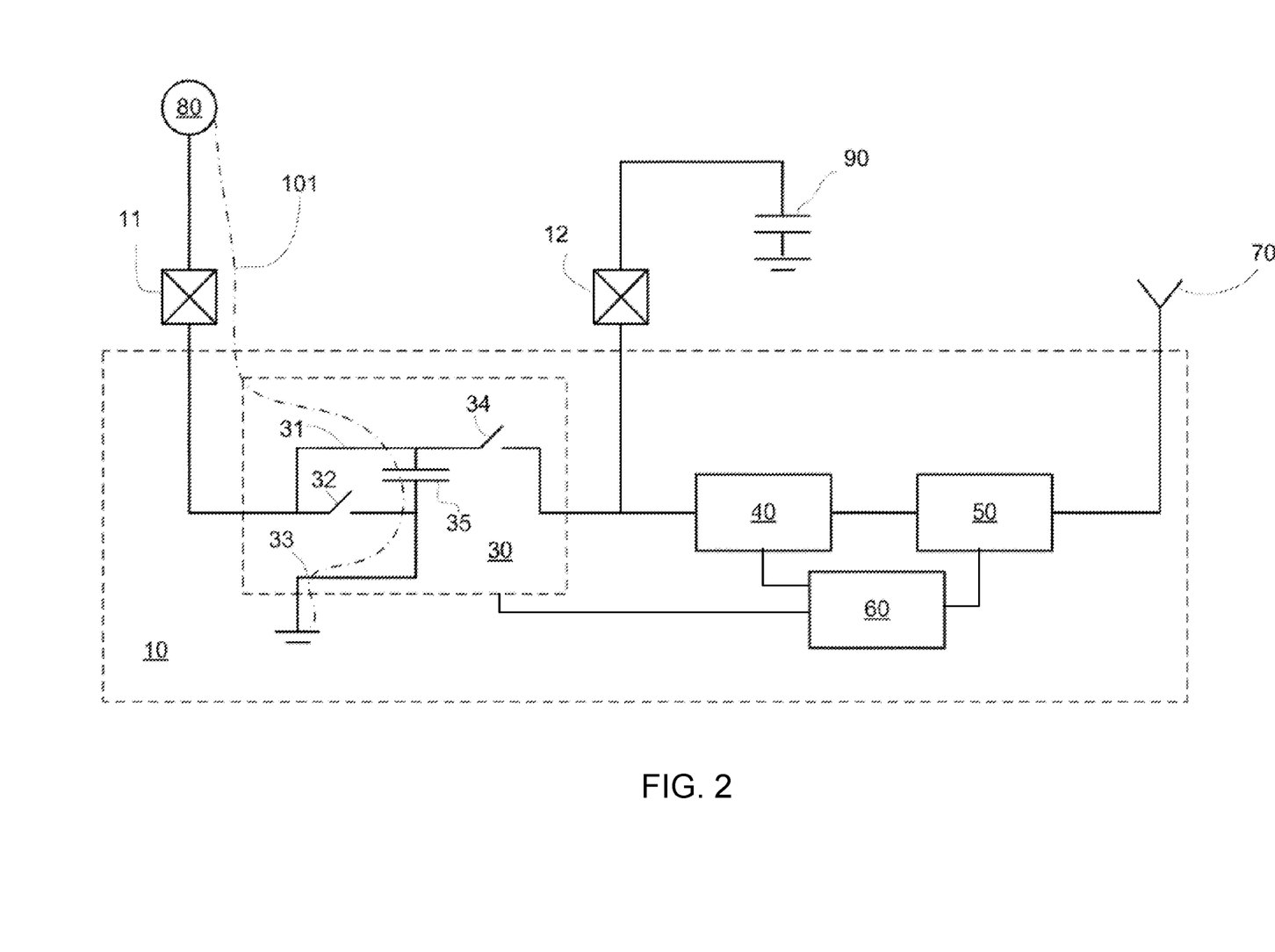
FIG. 2 illustrates an example of the device during a charging, by a coin cell, of a charge pump capacitor of the device.

FIG. 2 illustrates the first phase—the first switch 31 and the third switch 33 are closed—thereby providing a charge path 101 between the coin cell 80 and the ground—through first interface 11, first switch 31, charge pump capacitor 35 and the ground.

Figure 3:
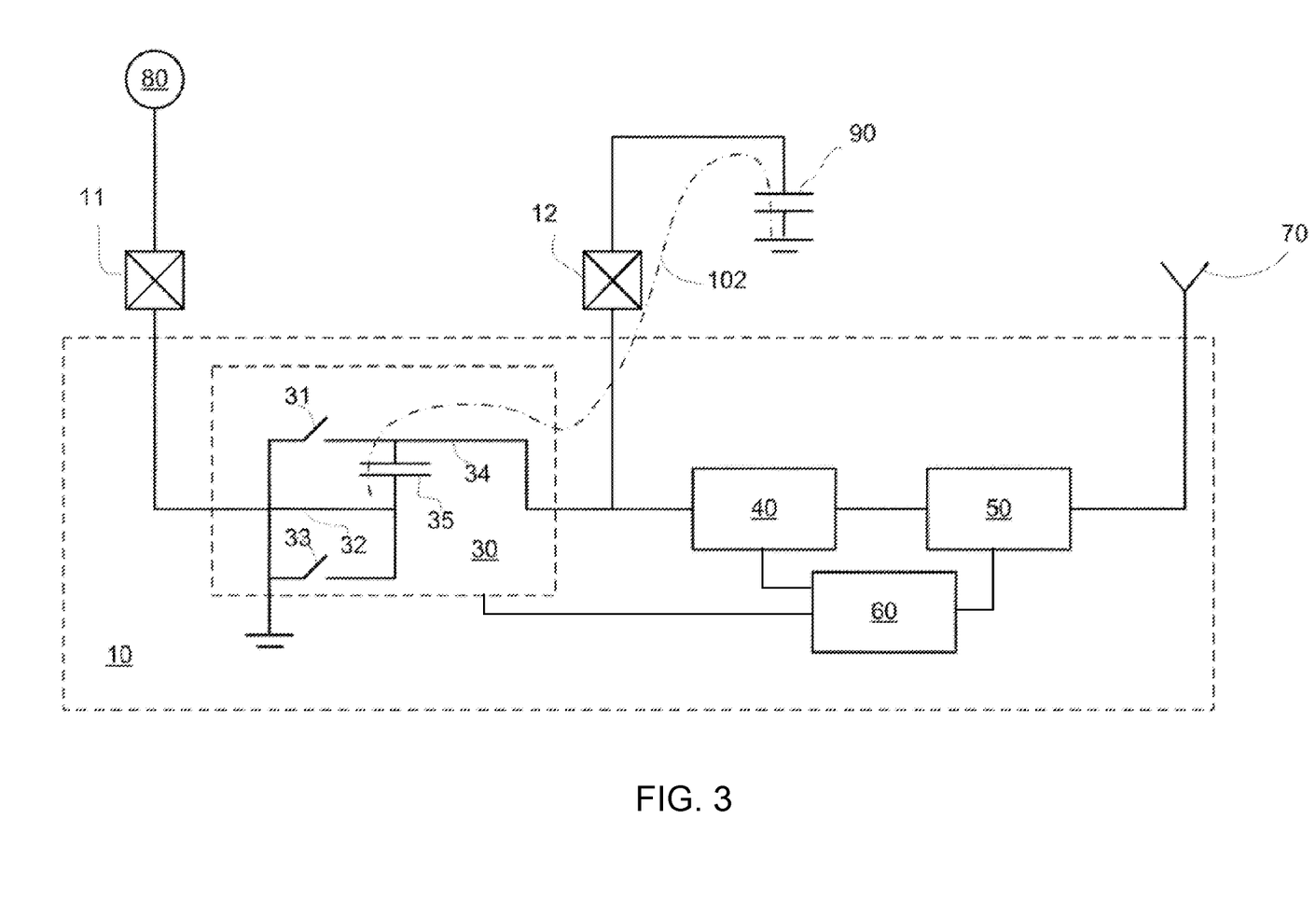
FIG. 3 illustrates an example of the device during a discharging of a charge pump capacitor and a charging of an external capacitor.

FIG. 3 illustrates the second phase—the second switch 32 and the fourth switch 34 are closed—thereby providing a discharge—charge path 102 between the second switch 32, the charge pump capacitor 35, the fourth switch 32, and second interface 12, the external capacitor 90 and the ground.

Figure 4:
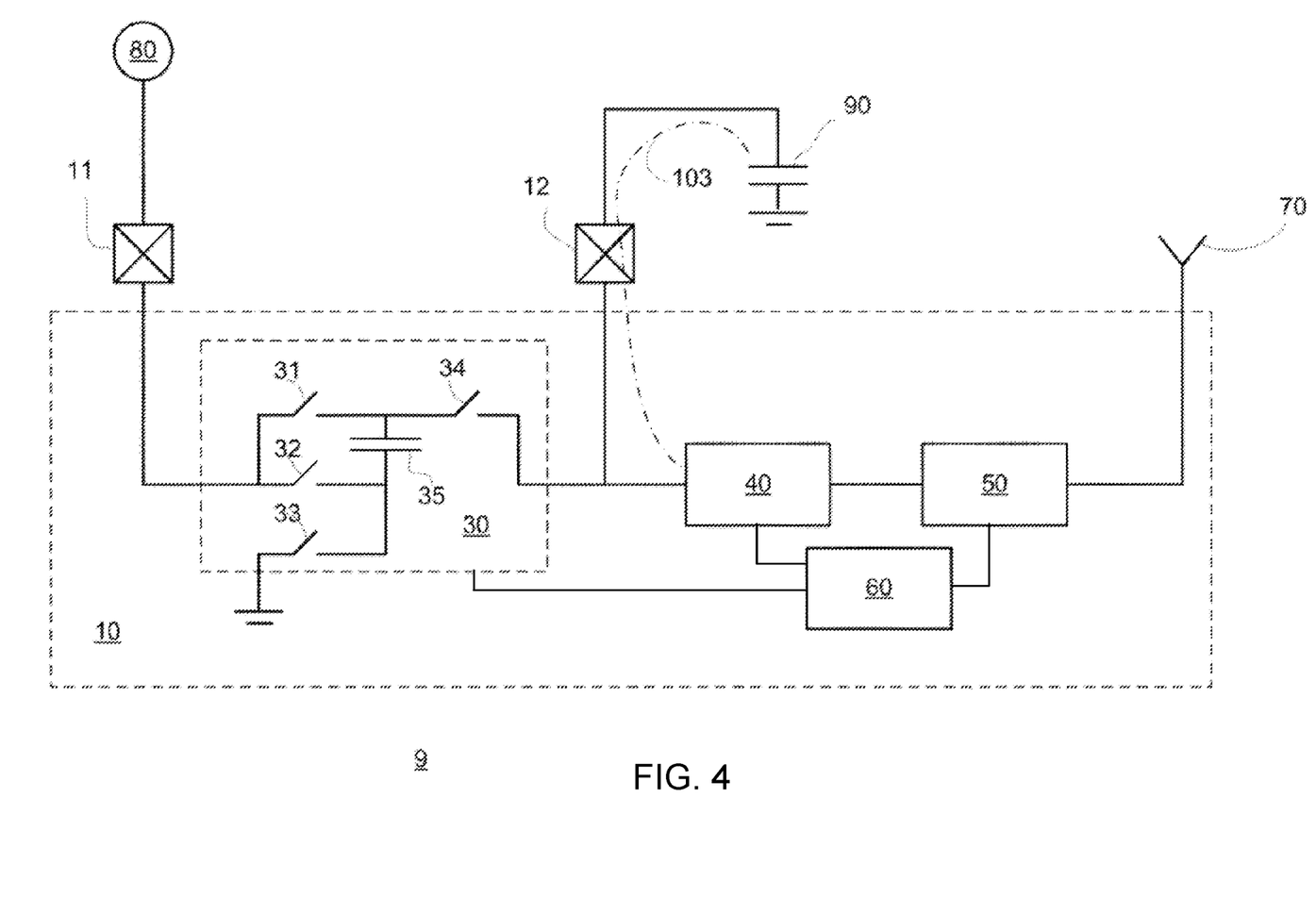
FIG. 4 illustrates an example of the device during a discharging of the external capacitor and feeding a transmitter during a transmission period.

FIG. 4 illustrates the transmission period—the first till fourth switches are open—thereby disconnecting the charge pump capacitor 35, the regulator 40 controls the discharge of the external capacitor 90 through a supply path 103 that includes the external capacitor 90, the second interface 12, the regulator 40 and the transmitter 50.

The charging of the external capacitor 90 may be triggered by a trigger send by a controller 60—for example the trigger may be sent a predefined duration before the required transmission. The predefined duration may equal to the charging period or may exceed the charging period of the external capacitor.

Because the duration between signals exceeds the transmission period the charging period may be much longer than the discharging period, the coin cell may effectively provide power and the charge pump may (while draining a low current—without choking the coin cell) charge the external capacitor to a higher voltage.

The higher voltage is higher (high dV) than the lowered voltage required by the transmitter—so that the external capacitor may be relatively small—a fraction of the very big prior art capacitors. For example—moving from dV of 0.15 volts to dV of 1.5 volts may allow using an external capacitor of about 10% of the capacitance of the prior art capacitors.

The long charging may allow to charge the external capacitor with enough charge to enable the provision of high currents required during the short transmission periods.

The timing of transmissions may be known in advance and the switch may be controlled to perform charging and discharging according to the transmission schedule.

Figure 5:
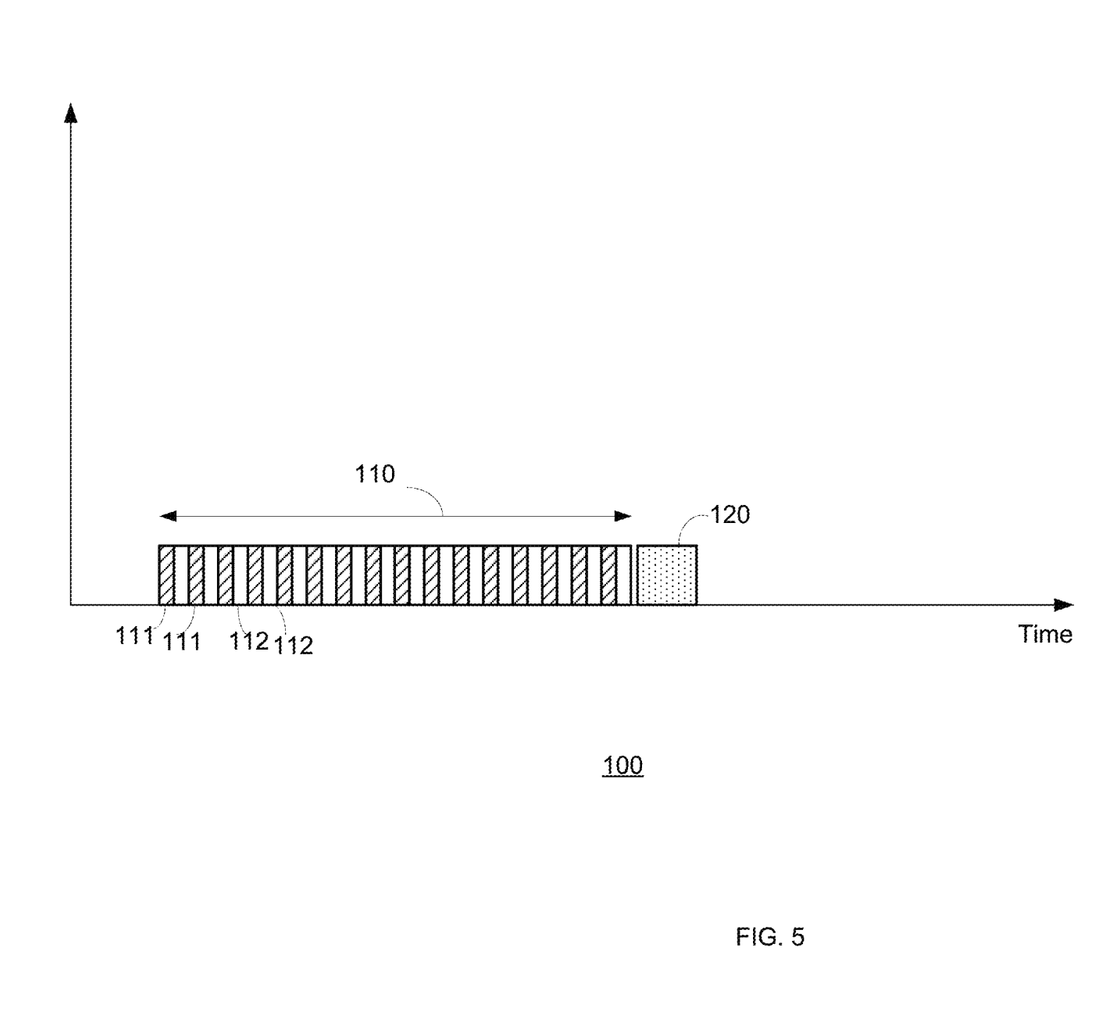
FIG. 5 illustrates an example of a timing diagram.

FIG. 5 is a timing diagram 100 that illustrates a charging period 110 that includes alternating first phase periods 111 and second phase periods 112. The charging period 110 may be followed by a transmission period 120.

The timing diagram may or may not be of scale.

Figure 6:
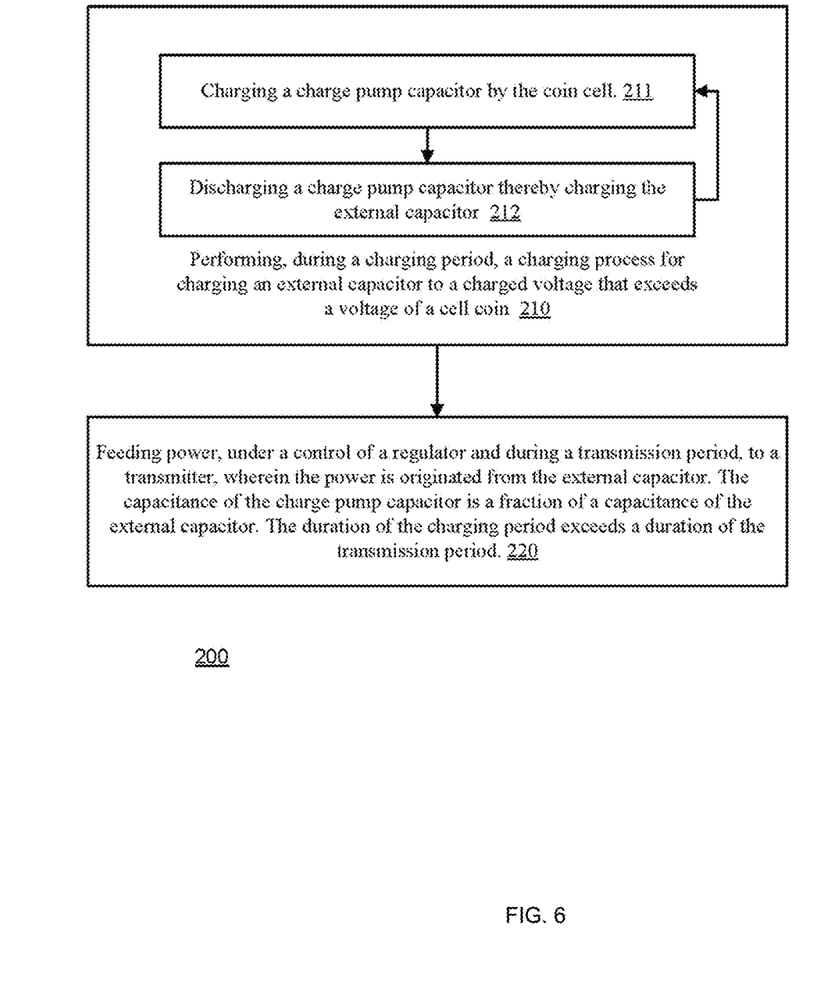
FIG. 6 illustrates an example of a method.

FIG. 6 illustrates an example of method 200.

Method 200 is for supplying power to a transmitter.

Method 200 may start by step 210 of performing, during a charging period, a charging process for charging an external capacitor to a charged voltage that exceeds a voltage of a cell coin. The charging process may include iterations of (a) charging (step 211) a charge pump capacitor by the coin cell, and (b) discharging (step 212) the charge pump capacitor thereby charging the external capacitor.

Step 210 may be followed by step 220 of feeding power, under a control of a regulator and during a transmission period, to a transmitter, wherein the power is originated from the external capacitor. The capacitance of the charge pump capacitor is a fraction of a capacitance of the external capacitor. The duration of the charging period exceeds a duration of the transmission period.

Step 210 and/or step 220 may include controlling the charging process by a controller.

The external capacitor and the coin cell may be external to a unit that includes the charge pump and the transmitter. The unit may be an integrated circuit.

The charged voltage exceeds the voltage of the coin cell by at least 1 volt. For example—may exceed the voltage of the cell coin by 1, 1.35, 1.5 volts and the like.

The average charge rate of the external capacitor, during the charging period, may be a fraction of the discharge rate of the external capacitor during the transmission period. Because the charging iteration includes multiple first phase and second phase iterations the average charge rate may include the amount of charge per iteration divided by the duration of the entire iteration or divided by the duration of the second phase only.

The duration of the charging period may exceed by a factor of at least two a duration of the transmission period.

Figure 7:
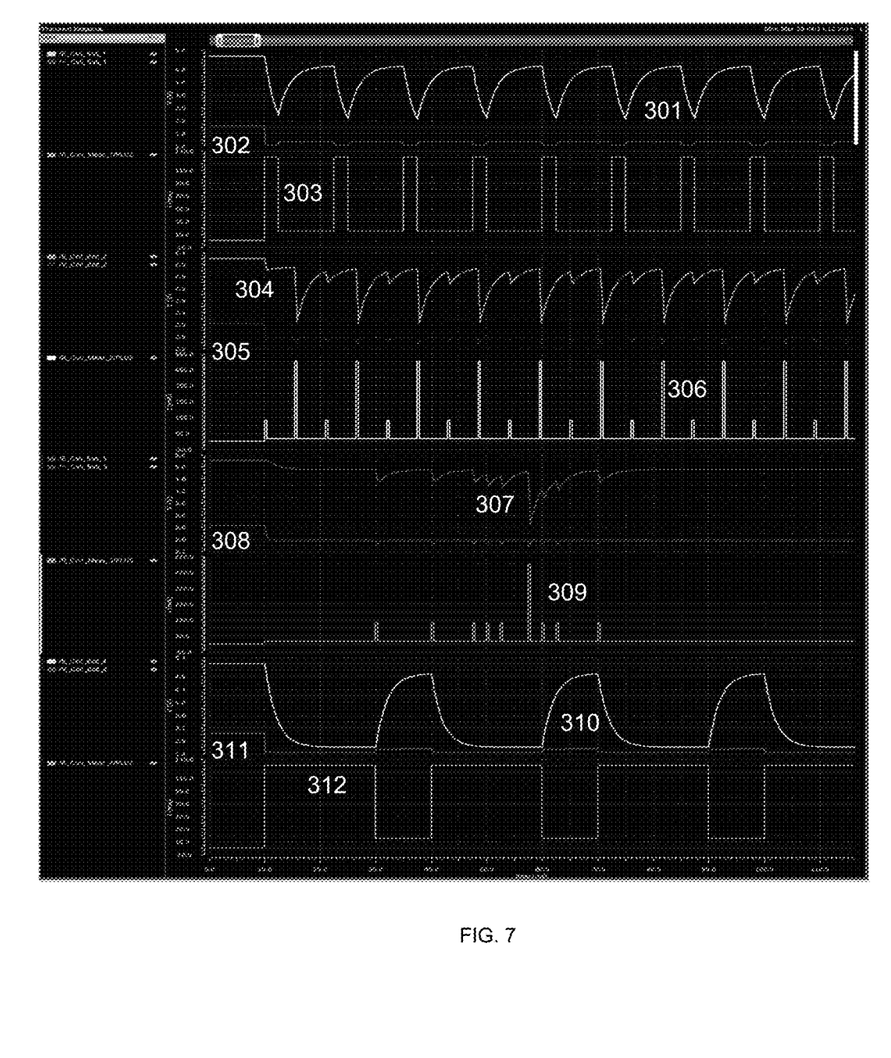
FIG. 7 illustrates another example of a timing diagram.

FIG. 7 illustrates another example of a timing diagram.

Curves 301-312 illustrate four different events that can happen during a DECT receive/transmit scenario.

Every scenario is described by two voltage graphs and one current. The two voltages are the voltage (curve 301) on the external capacitor 90 and the voltage (curve 302) after the regulator 40. The current (curve 303) is drawn by the transmitter 50 (orange). In this case the transmitter current consisted of a low 130 mA period and a high 500 mA period.

In the first scenario there are a series of low transmit periods. Every time the current is drawn the voltage on the external capacitor in yellow drops down from about 5V to about 3.4V but the voltage after the regulator stays relatively stable at about 2.4V supplying the transmitter with a stable operating voltage. After every transmit period we can see that the doubler 30 manages to recharge the voltage on the external capacitor back to the needed voltage before the next transmit period.

In the second event (voltage curves 304, 305 and current curve 306) there is a series of short low and high transmit periods. The capacitor's voltage (curve 304) drops sharply after every high current peaks (curve 306). The low current period adds a smaller drop but still overall the doubler manages to recharge the capacitor with enough charge every time before the next current period. Without the doubler the same charge would need to be stored in a much larger capacitor.

The third event (voltage curves 307 and 308, current curve 309) shows a series of more condensed low current period and one high current period (curve 309) and still we can see in curve 307) that the doubler manages to recover the charge enough and the voltage after the regulators in brawn stays stable.

The fourth event (voltage curves 310 and 311, current curve 312) consists of wider low current only periods and again the system holds the voltage.

In the foregoing specification, the invention has been described with reference to specific examples of embodiments of the invention. It will, however, be evident that various modifications and changes may be made therein without departing from the broader spirit and scope of the invention as set forth in the appended claims Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner. The integrated circuit may be a system on chip, a general-purpose processor, a signal processor, an FPGA, a neural network integrated circuit, and the like.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for supplying power to a transmitter, the method comprising:

performing, during a charging period, a charging process for charging an external capacitor to a charged voltage that exceeds a voltage of a coin cell, wherein the charging process comprises iterations of (a) charging a charge pump capacitor by the coin cell, and (b) discharging the charge pump capacitor to charge the external capacitor; and during a transmission period, feeding power, under control of a regulator, from the external capacitor to the transmitter;

wherein a capacitance of the charge pump capacitor is less than a capacitance of the external capacitor, and wherein a duration of the charging period exceeds a duration of the transmission period.

2. The method according to claim 1, wherein the charging process is controlled by a controller.

3. The method according to claim 1, wherein the external capacitor and the coin cell are external to a unit that comprises the charge pump and the transmitter.

4. The method according to claim 3, wherein the unit is an integrated circuit.

5. The method according to claim 1, wherein the charged voltage exceeds the voltage of the coin cell by at least 1 volt.

6. The method according to claim 1, wherein an average charge rate of the external capacitor, during the charging period, is less than a discharge rate of the external capacitor during the transmission period.

7. The method according to claim 1, wherein the duration of the charging period exceeds the duration of the transmission period by a factor of at least two.

8. A non-transitory computer-readable medium having processor-executable instructions stored thereon for supplying power to a transmitter, wherein the processor-executable instructions, when executed, facilitate:

performing, during a charging period, a charging process for charging an external capacitor to a charged voltage that exceeds a voltage of a coin cell, wherein the charging process comprises iterations of (a) charging a charge pump capacitor by the coin cell, and (b) discharging the charge pump capacitor to charge the external capacitor; and during a transmission period, feeding power, under control of a regulator, from the external capacitor to the transmitter;

wherein a capacitance of the charge pump capacitor is less than a capacitance of the external capacitor, and wherein a duration of the charging period exceeds a duration of the transmission period.

9. The non-transitory computer-readable medium according to claim 8, wherein the charged voltage exceeds the voltage of the coin cell by at least 1 volt.

10. The non-transitory computer-readable medium according to claim 8, wherein an average charge rate of the external capacitor, during the charging period, is less than a discharge rate of the external capacitor during the transmission period.

11. The non-transitory computer-readable medium according to claim 8, wherein the duration of the charging period exceeds the duration of the transmission period by a factor of at least two.

12. A device for supplying power to a transmitter, wherein the device comprises:

a memory having executable instructions stored thereon; and a controller configured to execute the instructions to facilitate the following being performed by the device:

performing, during a charging period, a charging process for charging an external capacitor to a charged voltage that exceeds a voltage of a coin cell, wherein the charging process comprises iterations of (a) charging a charge pump capacitor by the coin cell, and (b) discharging the charge pump capacitor to charge the external capacitor; and during a transmission period, feeding power, under control of a regulator of the device, from the external capacitor to the transmitter;

wherein a capacitance of the charge pump capacitor is less than a capacitance of the external capacitor, and wherein a duration of the charging period exceeds a duration of the transmission period.

13. The device according to claim 12, wherein the charged voltage exceeds the voltage of the coin cell by at least 1 volt.

14. The device according to claim 12, wherein an average charge rate of the external capacitor, during the charging period, is less than a discharge rate of the external capacitor during the transmission period.

15. The device according to claim 12, wherein the duration of the charging period exceeds the duration of the transmission period by a factor of at least two.

\* \* \* \* \*